United States Patent
Quaderer et al.

[19]

[11] Patent Number: 6,157,300
[45] Date of Patent: Dec. 5, 2000

[54] FLEXIBLE TAG AGITATOR

[75] Inventors: James Gerard Quaderer, Sunnyvale; Victor Allen Vega, Hercules, both of Calif.

[73] Assignee: Motorola, Inc., Schaumburg, Ill.

[21] Appl. No.: 09/225,408

[22] Filed: Jan. 5, 1999

Related U.S. Application Data

[63] Continuation-in-part of application No. 09/061,146, Apr. 16, 1998.

[51] Int. Cl.[7] .............................. G08B 13/24; G08B 21/00
[52] U.S. Cl. ................... 340/572.1; 198/341; 198/464.1; 226/9; 226/100; 340/825.34
[58] Field of Search ........................... 340/572.1, 825.34, 340/825.35, 676, 674; 226/1, 8, 9, 100; 198/341, 349, 464.1; 414/787, 786

[56] References Cited

U.S. PATENT DOCUMENTS

| | | | |
|---|---|---|---|
| 4,576,286 | 3/1986 | Buckley et al. | 209/558 |
| 5,339,962 | 8/1994 | Sommer, Jr. et al. | 209/576 |
| 5,450,492 | 9/1995 | Hook et al. | 380/28 |
| 5,819,954 | 10/1998 | Lacriola | 198/349 |

*Primary Examiner*—Glen Swann
*Attorney, Agent, or Firm*—Terri S. Hughes

[57] ABSTRACT

Flexible tags are secured to parcels moving upon a conveyor belt. The flexible tags each contain a transponder circuit in electrical communication with a transponder antenna. The transponder circuit contains a unique digital code containing data relating to the parcel. A reader circuit located in proximity to the conveyor is in electrical communication with a reader antenna. The reader circuit generates a signal in the presence of a flexible tag, which is transmitted to the transponder antenna located on the flexible tag. The signal energizes the transponder circuit in the flexible tag, which sends a unique digital code via the transponder antenna back to the reader antenna. The digital code is transmitted from the reader antenna to the reader circuit, where the digital code is analyzed to identify the contents of the parcel. The flexible tags are agitated by forced air from a fan to orient the flexible tags in non-parallel alignment in relation to the reader antenna as they move along a conveyor.

24 Claims, 3 Drawing Sheets

FLEXIBLE TAG AGITATOR

CROSS-REFERENCE TO RELATED APPLICATIONS

This is a continuation-in-part of a pending commonly-assigned prior application by Theodore D. Geiszler et al. entitled "Remotely powered electronic tag with plural electrostatic antennas and associated exciter/reader and related method; radio frequency identification tag system using tags arranged for coupling to ground; radio frequency identification tag arranged for magnetically storing tag state information; and radio frequency identification tag with a programmable circuit state," application Ser. No. 09/061,146, filed Apr. 16, 1998, attorney docket number IND00701P01, the disclosure of which prior application is hereby incorporated by reference, verbatim and with the same effect as though it were fully and completely set forth herein.

TECHNICAL FIELD

This invention relates to the identification and orientation of flexible tags on parcels located upon a conveyor.

BACKGROUND OF THE INVENTION

Automatic conveyor systems often transport a plurality of goods in parcels which must be individually identified to be properly sorted. Parcels such as airline baggage, shipping containers, production inventory, machine parts, and component parts are often identified with flexible tags. Electromagnetic sensing is sometimes used to identify the flexible tags on individual parcels placed upon a conveyor.

U.S. Pat. No. 5,339,962 issuing to Sommer Jr. et al. on Aug. 23, 1994 discloses a method and apparatus for sorting materials using electromagnetic sensing. This patent discloses the selective use of an air blast to remove articles from a conveyor.

U.S. Pat. No. 4,576,286 issuing to Buckley et al. on Mar. 18, 1986 discloses a parts sorting system wherein wave energy of a single frequency interacts with the part, and is sensed to generate a signal representative of a characteristic of the amplitude and phase of the detected wave energy.

U.S. Pat. No. 5,450,492 issuing to Hook et al. on Sep. 12, 1995 is representative of an electronic identification system having a transmitter for generating an electromagnetic excitation signal, and one or more transponders with variable time and frequency.

To be effective, the flexible tags on individual parcels must first be oriented to position the flexible tags in relation to the reader antenna positioned in proximity to the conveyor belt. Flexible tags which lie parallel to the reader antenna significantly decrease electrostatic coupling. Manual orientation of the parcels to orient the flexible tags in relation to reader antenna is labor intensive and time consuming. Thus, what is needed is a way to automatically orient the flexible tags in relation to reader antenna to improve identification of the parcels upon the conveyor belt.

SUMMARY OF THE INVENTION

Multiple parcels each having a flexible tag secured thereon are moved along a conveyor. The flexible tags each contain a transponder circuit in electrical communication with a transponder antenna. The transponder circuit contains information relating to the parcel. A reader circuit located in proximity to the conveyor is in electrical communication with a reader antenna. The reader circuit generates a signal in the presence of a flexible tag, which is transmitted to the transponder antenna located on the flexible tag. The signal energizes the transponder circuit in the flexible tag, which sends a unique digital code via the transponder antenna back to the reader antenna. The digital code is transmitted from the reader antenna to the reader circuit, where the digital code is analyzed to identify the parcel. The flexible tags are agitated by forced air from a fan to orient the flexible tags in non-parallel alignment in relation to the reader antenna as they move along a conveyor.

BRIEF DESCRIPTION OF THE DRAWINGS

A preferred embodiment of the present invention will now be described with reference to the accompanying drawings, in which.

DETAILED DESCRIPTION OF THE PREFERRED EMBODIMENT

For purposes of this disclosure, the term "conveyor" is intended to include all means of conveying objects along a specific path, including without limitation conveyor belts, gravity feed conveyors, inertia conveyors, roller conveyors and fluid conveyors.

The flexible tag agitator apparatus shown in FIG. 1 through FIG. 6, comprises a fan 12 driven by a motor 14 or other prime mover which is typically powered from a remote source (not shown), such as electricity. The fan 12 is rotatably supported in a suitable housing 16 which is positioned in proximity to a conveyor 18. The fan 12 may be rotated either radially or axially, to suit orientation, available space, and manufacturing or design preference.

Figure 1:
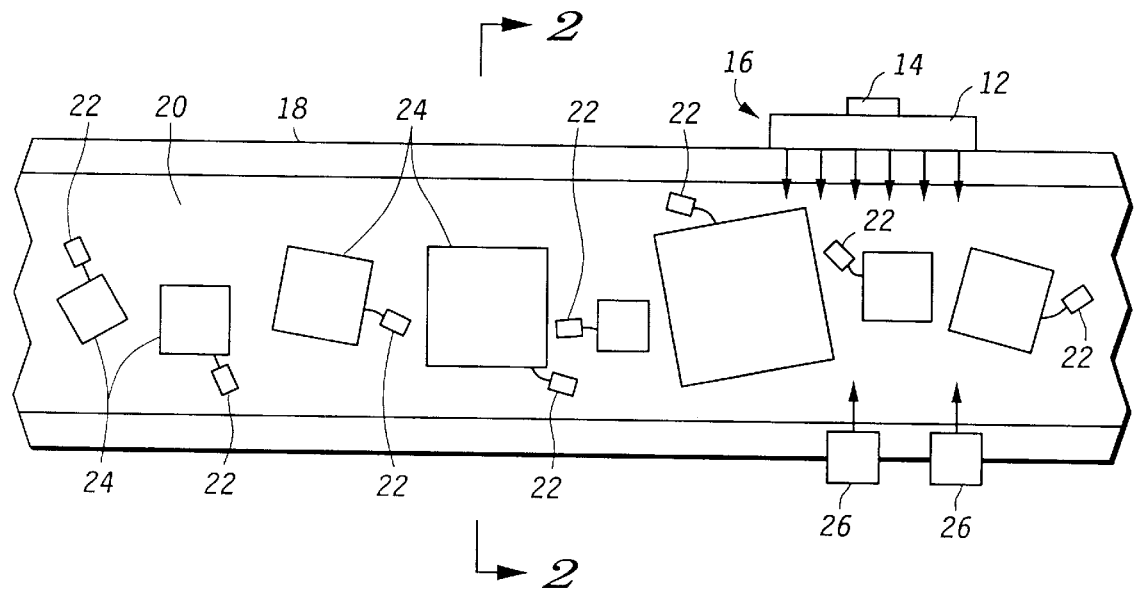
FIG. 1 is a top view of a plurality of parcels located upon a conveyor.

The conveyor 18 has a conveyor belt 20 which advances along the conveyor 20 to move randomly oriented parcels 24, each having a flexible tag 22 secured thereto, as shown in FIG. 1. The fan 12 is oriented to forcibly drive air past the flexible tag(s) 22. The flexible tag(s) 22 are agitated by the forced air to better position the flexible tags 22 for reading by one or more reader antenna(s) 26 which are positioned in close proximity to the conveyor belt 20.

Orientation of the reader antenna(s) 26 is dependent upon the orientation of the forced air driven by the fan 12. Preferably, the reader antenna 26 is orientated substantially perpendicular to the position of the flexible tag(s) 22, as the flexible tag(s) 22 are agitated by the forced air blown from the fan 12. Other orientations will also be satisfactory, providing that the reader antenna 26 is not oriented parallel to the flexible tag 22 when the flexible tag 22 is agitated by the fan 12. Parallel orientation of the reader antenna 26 in relation to the transponder antenna 30 significantly decreases electrostatic coupling between the reader antenna(s) 26 and the transponder antenna 30 located in the flexible tag 22. Therefore, the reader antenna is positioned in non-parallel alignment with the flexible tag(s) 22, as they are agitated by the fan 12.

Figure 6:
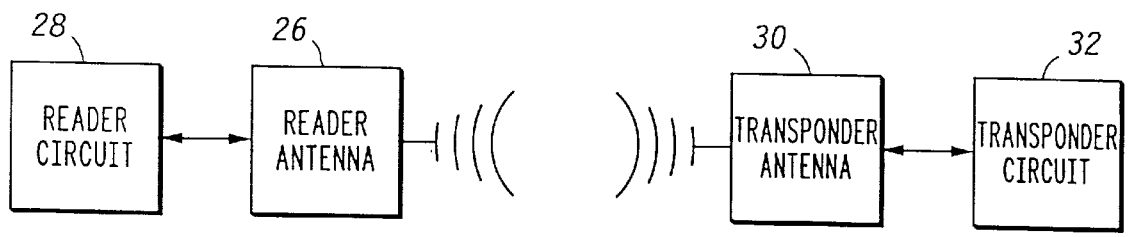
FIG. 6 is a block diagram view of the transponder circuit embedded within the flexible tag, and the reader circuit secured in proximity to the conveyor.

The flexible tag(s) 22 each contain a transponder circuit 32 in electrical communication with a transponder antenna 30, as shown in FIG. 6. The transponder circuit 32 contains a unique digital code which contains information relating to the contents, destination, ownership, history or inventory data relating to a specific parcel 24.

A reader circuit 28 is located in proximity to the conveyor 18 and the reader circuit 28 is in electrical communication with the reader antenna 26. The reader circuit 28 generates a signal in the presence of a flexible tag 22, which is transmitted by the reader antenna 26 to the transponder antenna 30 located on the flexible tag 22. The signal energizes the transponder circuit 32 in the flexible tag 22, which sends a unique digital code via the transponder antenna 30 back to the reader antenna 28. The digital code is transmitted from the reader antenna 28 to the reader circuit 26, where the digital code is analyzed to identify the ownership, contents, history, destination, and/or disposition of the parcel 24.

Figure 3:
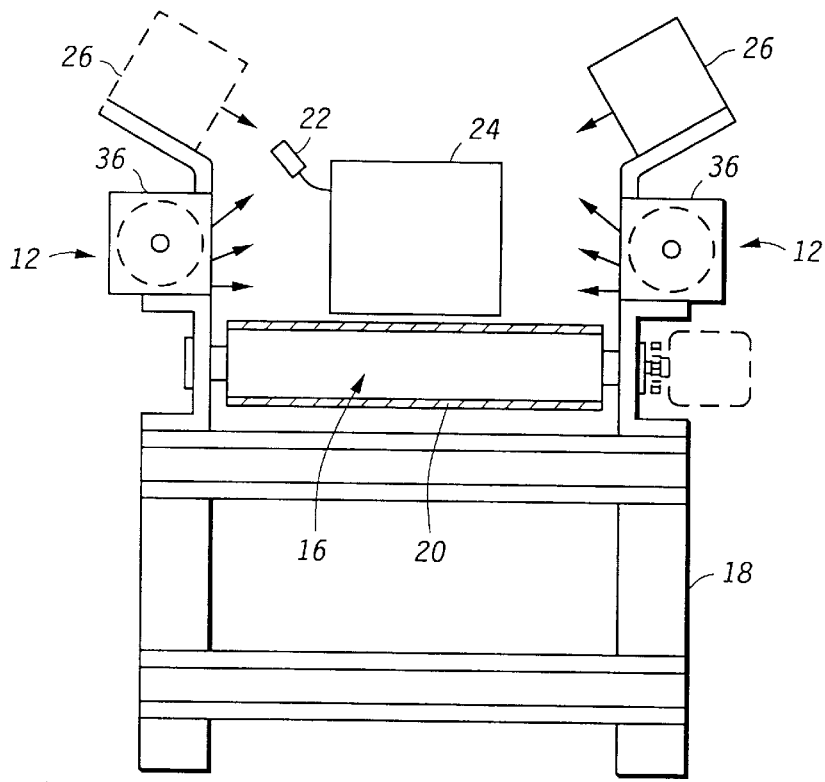
FIG. 3 is a cross sectional view of a conveyor taken along lines 2—2 in FIG. 1, wherein opposing axial fans are used to agitate the flexible tags located upon the sides of the parcels.

One or more axial fan(s) 36 may be positioned parallel with one or both sides of the conveyor 18, and may be orientated to drive air directly against the sides of the parcel 24, as shown in FIG. 3. This will agitate each flexible tag 22 as it moves along the conveyor 18. The reader antenna(s) 28 are preferably positioned in near perpendicular alignment with the flexible tag(s) 22, as shown in FIG. 3. Any non-parallel alignment of the antenna electrode(s) in relation to the agitated flexible tag(s) will produce satisfactory results, however, near-perpendicular alignment is preferred.

An axial fan 36 may be used to force the air either upwards, downwards, sideways, or at an angle, to suit the conveyor 18 configuration, and the orientation of the flexible tag(s) 22 as they are agitated by the axial fan 36. Axial fans 36 have the advantage of being compact in height and thickness while being any suitable length, and can be positioned to direct a focused stream of air. Axial fan(s) may be positioned directly onto the sides of the conveyor 18, and do not substantially limit access to the sides of the conveyor 18 or to the conveyor belt 20 during use.

Figure 2:
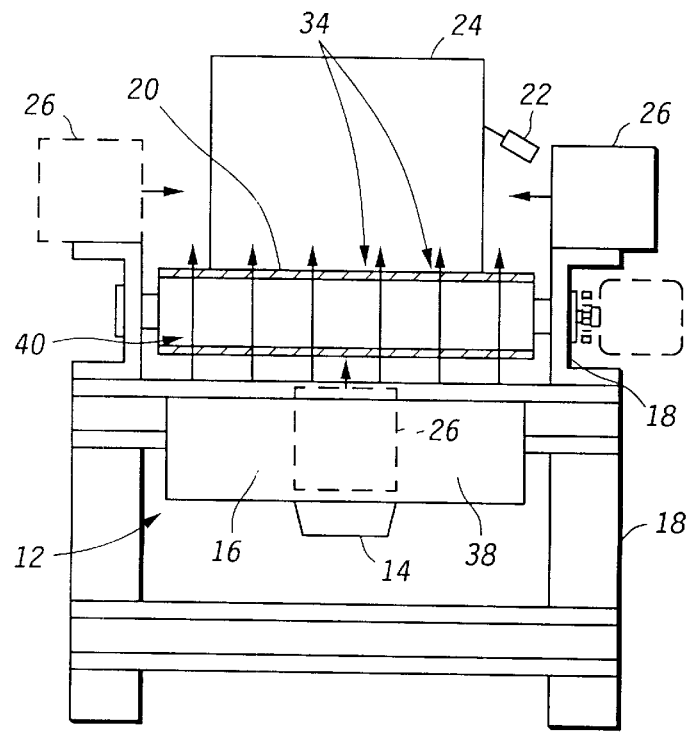
FIG. 2 is an cross sectional view of the conveyor taken along lines 2—2 in FIG. 1, showing a radial fan positioned beneath the conveyor to agitate the flexible tags located upon the sides of a parcel on a conveyor.

A radial fan 38 may also be used to force the air either upwards, downwards, sideways, or at an angle, to suit the conveyor 20 configuration and the orientation of the flexible tag(s) 22 as they are agitated by the radial fan 38. The reader antenna(s) 26 are preferably positioned in near-perpendicular alignment in relation to the orientation of the flexible tags 22 as they are agitated by the air from the fan 12. Radial fan(s) have the advantage of moving large quantities of air over a broad height and length substantially equal to the radius of the fan, while being compact in thickness.

Where apertures 34 are provided in the conveyor belt 20, the fan 12 may be located beneath the conveyor belt 20, forcing air upward through the apertures 34 in the conveyor belt 20, as shown in FIG. 2. In this embodiment, the conveyor belt 20 may be of mesh construction, and the forced air from the fan 12 (either radial or axial) passes through the apertures 34 in the mesh conveyor belt 20 to agitate the flexible tag(s) 22.

Alternately, rollers 40 may be used in place of a conveyor belt 20, and the fan 12 may be located beneath the rollers 40. The rollers 40 may be driven by a chain, belt or motor to move the parcels 24 along the conveyor 18, in a manner well known in the art. One or more rollers 40 may also be free to rotate and not driven. Air from the fan 12 passes through the space between the rollers 40 to agitate the flexible tag(s) located on the parcels 24.

It should be noted that flexible tags 22 located beneath the parcel 24 will not be affected by the forced air from the fan blade 12. However, the flexible tags 22 located beneath the parcel 24 may be read by reader antenna 26 positioned beneath the rollers 40 in proximity to the space between the rollers 40. Where the reader antenna 26 is aligned between the rollers 40, the rollers are preferably made of a non-conductive material.

Figure 4:
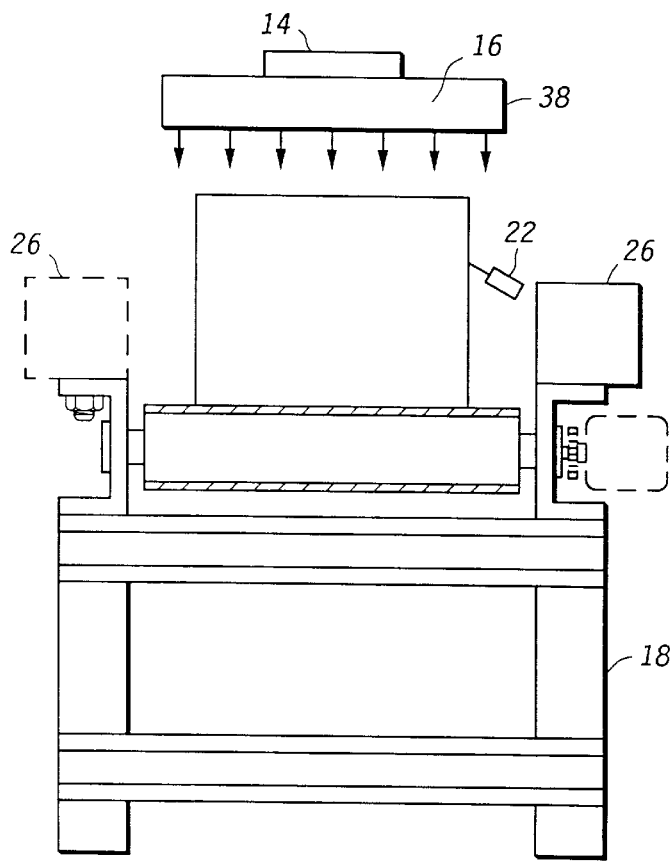
FIG. 4 is cross sectional view of a radial fan used to agitate the flexible tags from above the parcels.
Figure 5:
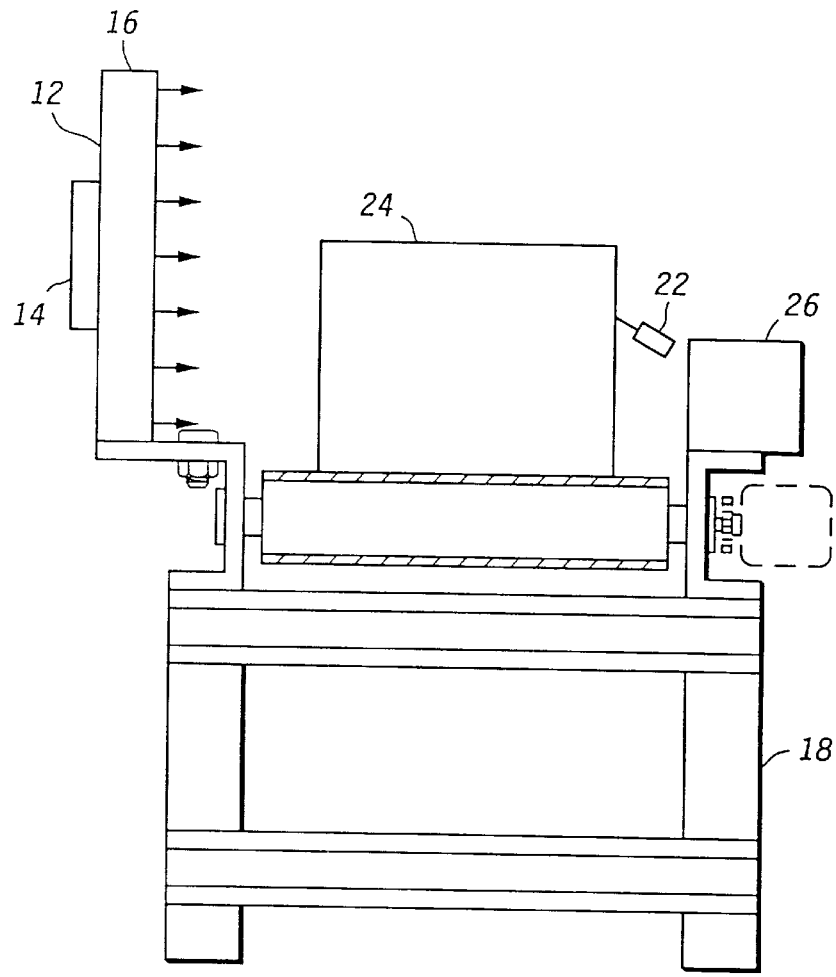
FIG. 5 is a cross sectional view of a conveyor taken along lines 2—2 in FIG. 1, wherein a radial fan is positioned on at least one side of the parcels.

Reader antenna 26 positioned on either side of the parcels 24 may be positioned to read the flexible tags 22 as forced air is directed downwardly by a fan 12 located above the parcels 24, as shown in FIG. 4.

Of course, it is within the scope of this disclosure to orient the fan(s) 12 in any orientation suitable to bias the flexible tag(s) 22 so that they may be more easily read by a suitably positioned reader antenna 26. The reader antenna 26 may also be positioned in any orientation in non-parallel alignment with the flexible tag(s) 22, when the flexible tags are agitated by a suitable fan 12. As previously noted, axial fans 36 may be used in place of radial fans 38, and vice versa, without departing from the scope of this disclosure.

While preferred embodiments of this invention have been disclosed herein, it will be understood that one of average skill in this art may make numerous modifications and adaptions of this invention, and such modifications and adaptions are intended to fall within the scope of this invention and the following claims.

We claim:

1. A flexible tag agitator apparatus, comprising:
    a) a conveyor for moving a plurality of parcels thereon, said parcels each having a flexible tag secured thereto;
    b) a reader antenna having a reader circuit, the reader antenna positioned in proximity to said conveyor;
    c) each flexible tag having a transponder antenna with a transponder circuit therein;
    d) a fan positioned in proximity to said conveyor, said fan positioned to agitate said flexible tag(s) and to orient said flexible tags into non-parallel alignment with said reader antenna so that data transmitted by the transponder antenna may be more easily read by the reader antenna to identify the contents of the parcel.

2. The flexible tag agitator apparatus of claim 1, wherein said fan is a radial fan.

3. The flexible tag agitator apparatus of claim 1, wherein said fan is an axial fan.

4. The flexible tag agitator apparatus of claim 1, wherein the conveyor has a conveyor belt with a plurality of apertures extending through the conveyor belt, and said fan is positioned beneath said conveyor belt to force air upwardly through said apertures in said conveyor belt, to agitate the flexible tags upon the parcels located upon the conveyor.

5. The flexible tag agitator apparatus of claim 1, wherein said conveyor includes a plurality of rollers, and at least one reader antenna is positioned for alignment between said rollers, and said fan is positioned beneath the rollers to force air upwardly through said apertures in said conveyor belt.

6. The flexible tag agitator apparatus of claim 5, wherein said rollers are made of a non-conductive material.

7. The flexible tag agitator apparatus of claim 1, wherein said fan is positioned on at least one side of said conveyor to forcefully agitate said flexible tags into non-parallel alignment with said reader antenna located in proximity to said conveyor.

8. The flexible tag agitator apparatus of claim 1, wherein said fan is positioned above said conveyor to forcefully agitate said flexible tags into non-parallel alignment with reader antenna located to at least one side of said parcels.

9. The flexible tag agitator apparatus of claim 1, wherein opposing fans are located upon opposing sides of the conveyor to forcefully agitate said flexible tags into non-parallel alignment with reader antenna located on opposing sides of the conveyor.

10. A flexible tag agitator apparatus, comprising:
   a) a conveyor for moving a plurality of parcels thereon, said parcels each having a flexible tag secured thereto;
   b) a reader antenna having a reader circuit, the reader antenna positioned in proximity to said conveyor;
   c) each flexible tag having a transponder antenna with a transponder circuit incorporated therein;
   d) a radial fan positioned in proximity to said conveyor, said radial fan positioned to agitate said flexible tag(s) and to orient said flexible tags into non-parallel alignment with said reader antenna so that data transmitted by the transponder antenna may be more easily read by the reader antenna to identify the contents of the parcel.

11. The flexible tag agitator apparatus of claim 10, wherein the conveyor has a conveyor belt with a plurality of apertures extending through the conveyor belt, and said radial fan is positioned beneath said conveyor belt to force air upwardly through said apertures in said conveyor belt, to agitate the flexible tags upon the parcels located upon the conveyor.

12. The flexible tag agitator apparatus of claim 10, wherein said conveyor includes a plurality of rollers, and at least one reader antenna is positioned for alignment between said rollers, and said radial fan is positioned beneath the rollers to force air upwardly through said apertures in said conveyor belt.

13. The flexible tag agitator apparatus of claim 12, wherein at least one said roller is driven by one of a belt, chain or motor to move said parcels along said conveyor.

14. The flexible tag agitator apparatus of claim 13, wherein said rollers are made of a non-conductive material.

15. The flexible tag agitator apparatus of claim 10, wherein said radial fan is positioned on at least one side of said conveyor to forcefully agitate said flexible tags into non-parallel alignment with said reader antenna located in proximity to said conveyor.

16. The flexible tag agitator apparatus of claim 10, wherein said radial fan is positioned above said conveyor to forcefully agitate said flexible tags into non-parallel alignment with reader antenna located on at least one side of said parcels.

17. The flexible tag agitator apparatus of claim 10, wherein opposing radial fans are located upon opposing sides of the conveyor to forcefully agitate said flexible tags into non-parallel alignment with reader antenna located on opposing sides of the conveyor.

18. A flexible tag agitator apparatus, comprising:
   a) a conveyor for moving a plurality of parcels thereon, said parcels each having a flexible tag secured thereto;
   b) a reader antenna cooperating with a reader circuit, the reader antenna positioned in proximity to said conveyor;
   c) each flexible tag having a transponder antenna with a transponder circuit incorporated therein;
   d) an axial fan positioned in proximity to said conveyor, said axial fan positioned to agitate said flexible tag(s) and to orient said flexible tags into non-parallel alignment with said reader antenna so that data transmitted by the transponder antenna located in each said flexible tag may be more easily read by the reader antenna to identify the contents of the parcel.

19. The flexible tag agitator apparatus of claim 18, wherein the conveyor has a conveyor belt with a plurality of apertures extending through the conveyor belt, and said axial fan is positioned beneath said conveyor belt to force air upwardly through said apertures in said conveyor belt, to agitate the flexible tags upon the parcels located upon the conveyor.

20. The flexible tag agitator apparatus of claim 18, wherein said conveyor includes a plurality of rollers, and at least one reader antenna is positioned for alignment between said rollers, and said axial fan is positioned beneath the rollers to force air upwardly through said apertures in said conveyor belt.

21. The flexible tag agitator apparatus of claim 20, wherein said rollers are made of a non-conductive material.

22. The flexible tag agitator apparatus of claim 18, wherein said axial fan is positioned on at least one side of said conveyor to forcefully agitate said flexible tags into non-parallel alignment with said reader antenna located in proximity to said conveyor.

23. The flexible tag agitator apparatus of claim 18, wherein said axial fan is positioned above said conveyor to forcefully agitate said flexible tags into non-parallel alignment with reader antenna located above said parcels.

24. The flexible tag agitator apparatus of claim 18, wherein opposing axial fans are located upon opposing sides of the conveyor to forcefully agitate said flexible tags into non-parallel alignment with reader antenna located on opposing sides of the conveyor.

* * * * *